(12) United States Patent
Bailey et al.

(10) Patent No.: US 11,797,720 B2
(45) Date of Patent: *Oct. 24, 2023

(54) TOOL BRIDGE

(71) Applicant: Magic Leap, Inc., Plantation, FL (US)

(72) Inventors: Richard St. Clair Bailey, Plantation, FL (US); Chun-Ip Fong, Fremont, CA (US); Erle Robert Bridgewater, Pompano Beach, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,989

(22) Filed: Sep. 21, 2022

(65) Prior Publication Data

US 2023/0014150 A1 Jan. 19, 2023

Related U.S. Application Data

(63) Continuation of application No. 17/175,467, filed on Feb. 12, 2021, now Pat. No. 11,494,528.

(Continued)

(51) Int. Cl.
*G06T 19/00* (2011.01)
*G06F 30/12* (2020.01)
(Continued)

(52) U.S. Cl.
CPC ......... *G06F 30/12* (2020.01); *G02B 27/0172* (2013.01); *G06T 19/006* (2013.01); *G06T 19/20* (2013.01); *G06F 2111/18* (2020.01)

(58) Field of Classification Search
None
See application file for complete search history.

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Extended European Search Report dated Jul. 26, 2021, for EP Application No. 19841636.4, filed Jul. 22, 2019, nine pages.

(Continued)

*Primary Examiner* — Nicholas R Wilson
(74) *Attorney, Agent, or Firm* — MORRISON & FOERSTER LLP

(57) ABSTRACT

Disclosed herein are systems and methods for sharing and synchronizing virtual content. A method may include receiving, from a host application via a wearable device comprising a transmissive display, a first data package comprising first data; identifying virtual content based on the first data; presenting a view of the virtual content via the transmissive display; receiving, via the wearable device, first user input directed at the virtual content; generating second data based on the first data and the first user input; sending, to the host application via the wearable device, a second data package comprising the second data, wherein the host application is configured to execute via one or more processors of a computer system remote to the wearable device and in communication with the wearable device.

20 Claims, 14 Drawing Sheets

Related U.S. Application Data

(60) Provisional application No. 62/976,995, filed on Feb. 14, 2020.

(51) Int. Cl.
*G02B 27/01* (2006.01)
*G06T 19/20* (2011.01)
*G06F 111/18* (2020.01)

(56) References Cited

U.S. PATENT DOCUMENTS

| | | |
|---|---|---|
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,488,294 B2 | 2/2009 | Torch |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-Zeev et al. |
| 9,720,505 B2 | 8/2017 | Gribetz et al. |
| 9,811,237 B2 | 11/2017 | Schileru |
| 10,013,053 B2 | 7/2018 | Cederlund et al. |
| 10,025,379 B2 | 7/2018 | Drake et al. |
| 10,528,349 B2 | 1/2020 | Kumar |
| 10,977,868 B2 | 4/2021 | Neeter |
| 11,201,953 B2 | 12/2021 | Babu J D et al. |
| 11,335,070 B2 | 5/2022 | Baier et al. |
| 11,475,644 B2 | 10/2022 | Bailey et al. |
| 11,494,528 B2 | 11/2022 | Bailey et al. |
| 2003/0030597 A1 | 2/2003 | Geist |
| 2005/0182844 A1 | 8/2005 | Johnson et al. |
| 2006/0023158 A1 | 2/2006 | Howell et al. |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0075343 A1 | 3/2012 | Chen et al. |
| 2013/0073707 A1 | 3/2013 | Butler et al. |
| 2013/0324245 A1 | 12/2013 | Harvey et al. |
| 2014/0123184 A1 | 5/2014 | Reisman |
| 2014/0168218 A1 | 6/2014 | Mitrea et al. |
| 2014/0195918 A1 | 7/2014 | Friedlander |
| 2015/0168731 A1 | 6/2015 | Robbins |
| 2016/0104452 A1 | 4/2016 | Guan et al. |
| 2016/0343164 A1 | 11/2016 | Urbach et al. |
| 2017/0236320 A1 | 8/2017 | Gribetz et al. |
| 2018/0181198 A1 | 6/2018 | Trotta |
| 2018/0197340 A1 | 7/2018 | Loberg et al. |
| 2018/0197341 A1 | 7/2018 | Loberg et al. |
| 2018/0321894 A1 | 11/2018 | Paulovich et al. |
| 2019/0019348 A1 | 1/2019 | Yamamoto et al. |
| 2019/0114802 A1 | 4/2019 | Lazarow |
| 2019/0244426 A1 | 8/2019 | Knoppert et al. |
| 2019/0392640 A1 | 12/2019 | Qian et al. |
| 2020/0005538 A1 | 1/2020 | Neeter |
| 2020/0051328 A1 | 2/2020 | Mohan et al. |
| 2020/0051337 A1 | 2/2020 | Reynolds et al. |
| 2020/0160601 A1 | 5/2020 | Shreve et al. |
| 2020/0225904 A1 | 7/2020 | Cooper et al. |
| 2021/0256261 A1 | 8/2021 | Wang et al. |
| 2022/0070278 A1 | 3/2022 | Babu J D et al. |
| 2022/0245905 A1 | 8/2022 | Baier et al. |
| 2022/0383634 A1 | 12/2022 | Wang et al. |
| 2023/0017752 A1 | 1/2023 | Bailey et al. |

FOREIGN PATENT DOCUMENTS

| | | |
|---|---|---|
| CA | 2388766 A1 | 12/2003 |
| CN | 110352085 A | 10/2019 |
| WO | 2018165039 A1 | 9/2018 |
| WO | 2018175335 A1 | 9/2018 |
| WO | 2021163224 A1 | 8/2021 |
| WO | 2021163373 A1 | 8/2021 |
| WO | 2021163624 A1 | 8/2021 |
| WO | 2021163626 A1 | 8/2021 |

OTHER PUBLICATIONS

Final Office Action dated Apr. 8, 2022, for U.S. Appl. No. 17/175,547, filed Feb. 12, 2021, fourteen pages.

Final Office Action dated Dec. 10, 2021, for U.S. Appl. No. 17/174,141, filed Feb. 11, 2021, 14 pages.

Final Office Action dated Oct. 27, 2020, for U.S. Appl. No. 16/518,891, filed Jul. 22, 2019, fifteen pages.

International Preliminary Report on Patentability and Written Opinion dated Jan. 26, 2021, for PCT Application No. PCT/US2019/042881, filed Jul. 22, 2019, 16 pages.

International Preliminary Report on Patentability and Written Opinion dated Aug. 25, 2022, for PCT Application No. PCT/US2021/017508, filed Feb. 10, 2021, nine pages.

International Preliminary Report on Patentability and Written Opinion dated Aug. 25, 2022, for PCT Application No. PCT/US2021/017718, filed Feb. 11, 2021, seven pages.

International Preliminary Report on Patentability and Written Opinion dated Aug. 25, 2022, for PCT Application No. PCT/US2021/018035, filed Feb. 12, 2021, 8 pages.

International Preliminary Report on Patentability and Written Opinion dated Aug. 25, 2022, for PCT Application No. PCT/US2021/018037, filed Feb. 12, 2021, nine pages.

International Search Report and Written Opinion dated Apr. 28, 2021, for PCT Application No. PCT/US2021/17508, filed Feb. 10, 2021, 16 pages.

International Search Report and Written Opinion dated Jun. 15, 2021, for PCT Application No. PCT/US2021/18037, filed Feb. 12, 2021, 17 pages.

International Search Report and Written Opinion dated May 3, 2021, for PCT Application No. PCT/US2021/18035, filed Feb. 12, 2021, 14 pages.

International Search Report dated Apr. 22, 2021, for PCT Application No. PCT/US2021/017718, filed Feb. 11, 2021, two pages.

International Search Report dated Oct. 2, 2019, for PCT Application No. PCT/US2019/042881, filed Jul. 22, 2019 three pages.

Jacob, R. "Eye Tracking in Advanced Interface Design", Virtual Environments and Advanced Interface Design, Oxford University Press, Inc. (Jun. 1995).

Non-Final Office Action dated Dec. 15, 2021, for U.S. Appl. No. 17/175,547, filed Feb. 12, 2021, thirteen pages.

Non-Final Office Action dated Feb. 17, 2022, for U.S. Appl. No. 17/175,467, filed Feb. 12, 2021, 23 pages.

Non-Final Office Action dated Mar. 16, 2022, for U.S. Appl. No. 17/174,141, filed Feb. 11, 2021, eighteen pages.

Non-Final Office Action dated May 14, 2020, for U.S. Appl. No. 16/518,891, filed Jul. 22, 2019, eighteen pages.

Non-Final Office Action dated Sep. 1, 2021, for U.S. Appl. No. 17/174,141, filed Feb. 11, 2021, thirteen pages.

Notice of Allowance dated Apr. 22, 2021, for U.S. Appl. No. 16/518,891, filed Jul. 22, 2019, nine pages.

Notice of Allowance dated Aug. 26, 2022, for U.S. Appl. No. 17/175,467, filed Feb. 12, 2021, eight pages.

Notice of Allowance dated Aug. 5, 2022, for U.S. Appl. No. 17/175,547, filed Feb. 12, 2021, nine pages.

Notice of Allowance dated Aug. 9, 2021, for U.S. Appl. No. 16/518,891, filed Jul. 22, 2019, eight pages.

Notice of Allowance dated Jan. 20, 2022, for U.S. Appl. No. 17/173,125, filed Feb. 10, 2021, twelve pages.

Notice of Allowance dated Jul. 11, 2022, for U.S. Appl. No. 17/174,141, filed Feb. 11, 2021, nine pages.

Notice of Allowance dated Nov. 23, 2021, for U.S. Appl. No. 17/173,125, filed Feb. 10, 2021, eleven pages.

Rolland, J. et al., "High-resolution inset head-mounted display", Optical Society of America, vol. 37, No. 19, Applied Optics, (Jul. 1, 1998).

(56) References Cited

OTHER PUBLICATIONS

Schmalstieg, D. et al. "Bridging Multiple User Interface Dimensions with Augmented Reality", Oct. 2000, In Proceedings IEEE and ACM International Symposium on Augmented Reality (ISAR 2000) pp. 20-29. (Year: 2000).
Shen, Y. et al., "Augmented Reality for Collaborative Product Design and Development", Elsevier, 2009 (Year: 2009).
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
YouTube. "Augmented Reality—annotating an object" https://www.youtube.com/watch?v=ESOZndNnGh0 (Year: 2019).
YouTube. "Real Object Annotations in Augmented Reality in Product Design", https://www.youtube.com/watch?v=cy8ow0reAfl (Year: 2013).
Chinese Office Action dated Mar. 29, 2023, for CN Application No. 202180028410.5, with English translation, 12 pages.
Chinese Office Action dated May 13, 2023, for CN Application No. 202180028398.8, with English translation, 6 pages.
European Communication dated Jan. 20, 2023, for EP Application No. 19841636.4, filed Jul. 22, 2019, six pages.
Non-Final Office Action dated Mar. 20, 2023, for U.S. Appl. No. 17/723,245, filed Apr. 18, 2022, sixteen pages.
Non-Final Office Action dated Jul. 5, 2023, for U.S. Appl. No. 17/944,079, filed Sep. 13, 2022, fourteen pages.
Notice of Allowance dated Jul. 21, 2023, for U.S. Appl. No. 17/174,141, filed Feb. 11, 2021, seven pages.
Extended European Search Report dated Jun. 9, 2023, for EP Application No. 21753843.8, nine pages.

TOOL BRIDGE

CROSS-REFERENCE TO RELATED APPLICATIONS

This application is a Continuation of U.S. Non-Provisional application Ser. No. 17/175,467, filed Feb. 12, 2021, which claims benefit of U.S. Provisional Application No. 62/976,995, filed Feb. 14, 2020, the contents of which are incorporated herein by reference in their entirety.

FIELD

This disclosure relates in general to systems and methods for sharing and synchronizing virtual content, and in particular to systems and methods for sharing and synchronizing virtual content in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

XR systems can be particularly useful for content creation, particularly 3D content creation. For example, users of computer-aided design ("CAD") software may routine create, manipulate, and/or annotate 3D virtual content. However, working with 3D virtual content on a 2D screen can be challenging. Using a keyboard and mouse to reposition 3D content may be frustrating and unintuitive because of inherent limitations of manipulating 3D content with 2D tools. XR systems, on the other hand, may provide a significantly more powerful viewing experience. For example, XR systems may be able to display 3D virtual content in three dimensions. An XR user may be able to walk around a 3D model and observe it from different angles as if the 3D virtual model was a real object. The ability to instantly see a virtual model as if it was real may significantly shorten development cycles (e.g., by cutting out steps to physically manufacture a model) and enhance productivity. It can therefore be desirable to develop systems and methods for creating and/or manipulating 3D models using XR systems to supplement and/or replace existing workflows.

XR systems can offer a uniquely heightened sense of immersion and realism by combining virtual visual and audio cues with real sights and sounds. Accordingly, it is desirable in some XR systems to present a virtual environment that enhances, improves, or alters a corresponding real environment. This disclosure relates to XR systems that enable consistent placement of virtual objects across multiple XR systems.

BRIEF SUMMARY

Examples of the disclosure describe systems and methods for sharing and synchronizing virtual content. According to examples of the disclosure, a method may include receiving, from a host application via a wearable device comprising a transmissive display, a first data package comprising first data; identifying virtual content based on the first data; presenting a view of the virtual content via the transmissive display; receiving, via the wearable device, first user input directed at the virtual content; generating second data based on the first data and the first user input; sending, to the host application via the wearable device, a second data package comprising the second data, wherein the host application is configured to execute via one or more processors of a computer system remote to the wearable device and in communication with the wearable device.

DETAILED DESCRIPTION

Figure 1A:
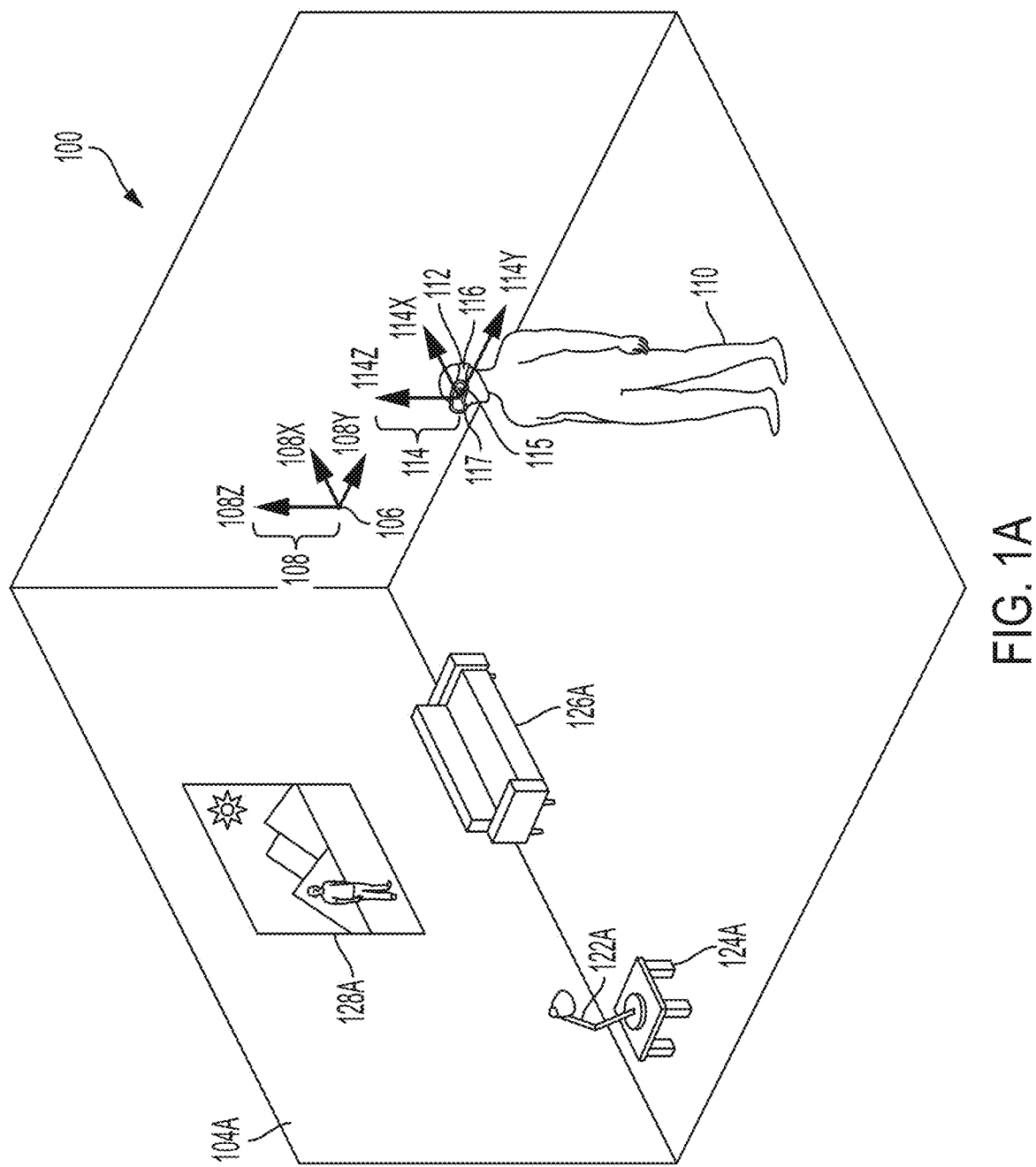
FIGS. 1A-1C illustrate an example mixed reality environment, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, an MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In an MRE, a virtual object (e.g., in a virtual environment associated with the MRE) can correspond to a real object (e.g., in a real environment associated with the MRE). For instance, if the real environment of an MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MRE, not all real objects in a real environment may be associated with a corresponding virtual object. Likewise, in some examples of an MRE, not all virtual objects in a virtual environment may be associated with a corresponding real object. That is, some virtual objects may solely in a virtual environment of an MRE, without any real-world counterpart.

In some examples, virtual objects may have characteristics that differ, sometimes drastically, from those of corresponding real objects. For instance, while a real environment in an MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
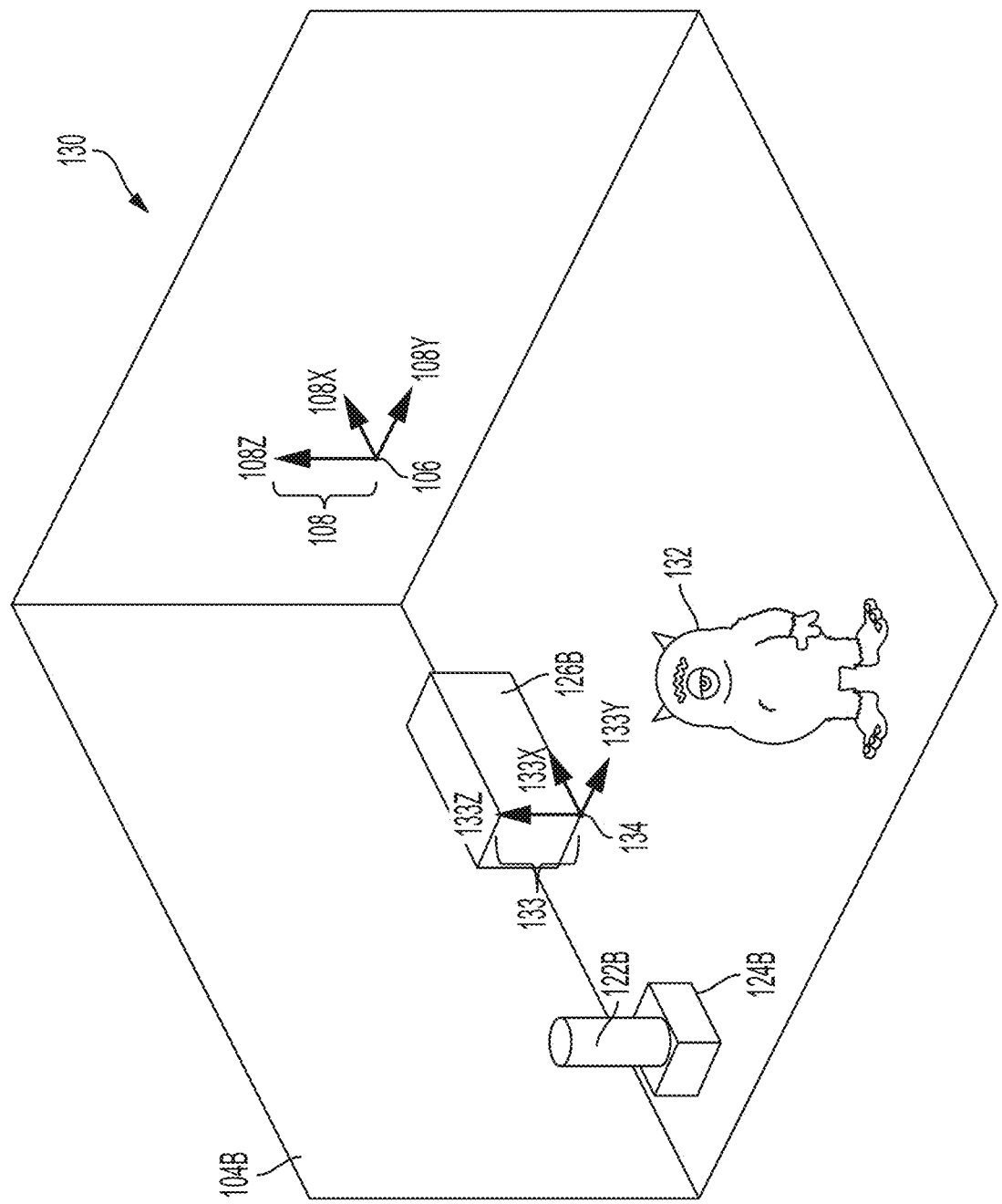

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. An MR user may look at the corner, see the virtual content, look away from the corner (where the virtual content may no longer be visible), and look back to see the virtual content in the corner (similar to how a real object may behave).

In some embodiments, persistent coordinate data (e.g., a persistent coordinate system) can include an origin point and three axes. For example, a persistent coordinate system may be assigned to a center of a room by an MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, an MR system may use simultaneous localization and mapping to generate persistent coordinate data (e.g., the MR system may assign a persistent coordinate system to a point in space). In some embodiments, an MR system may map an environment by generating persistent coordinate data at regular intervals (e.g., an MR system may assign persistent coordinate systems in a grid where persistent coordinate systems may be at least within five feet of another persistent coordinate system).

In some embodiments, persistent coordinate data may be generated by an MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, an MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
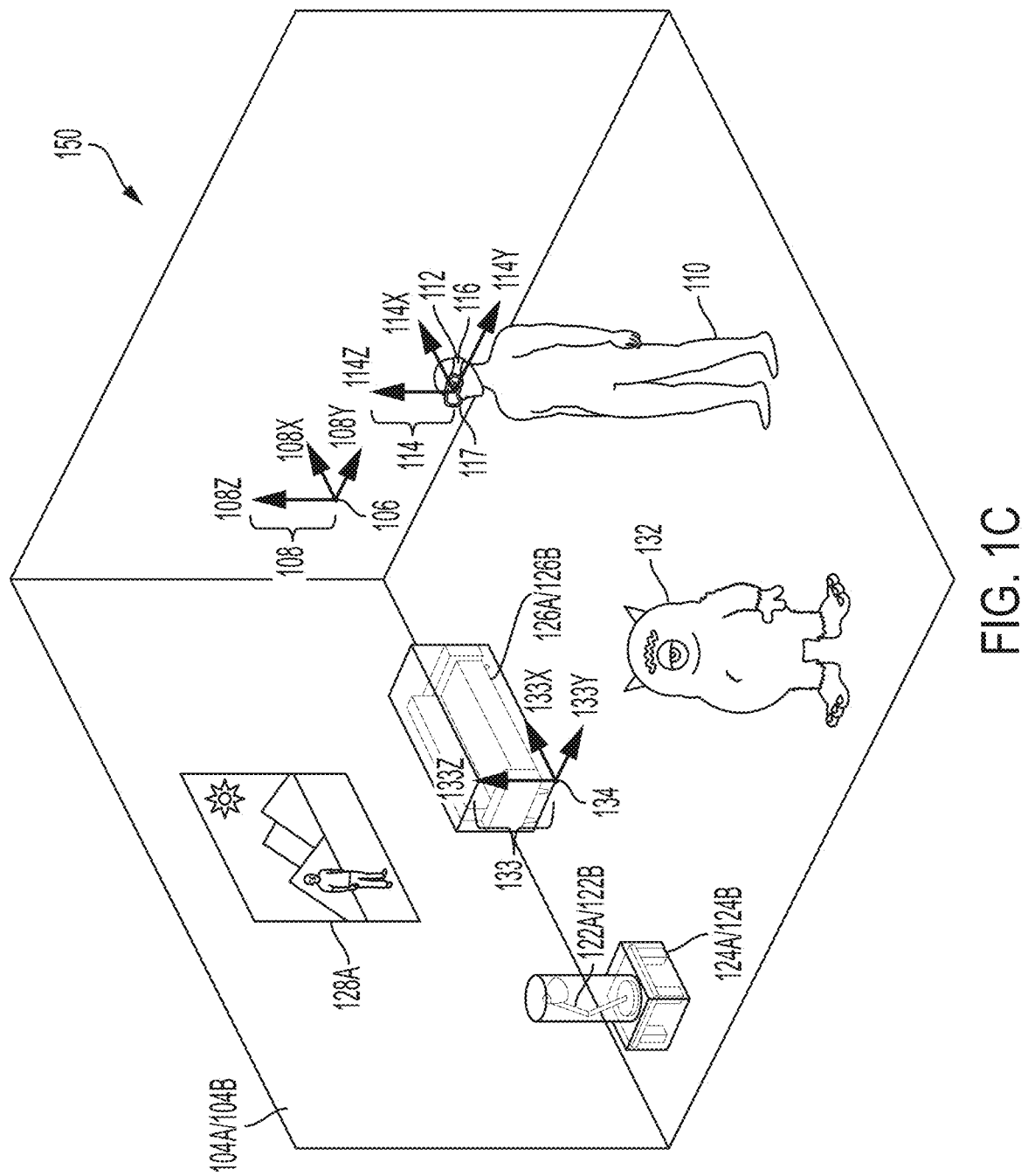

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
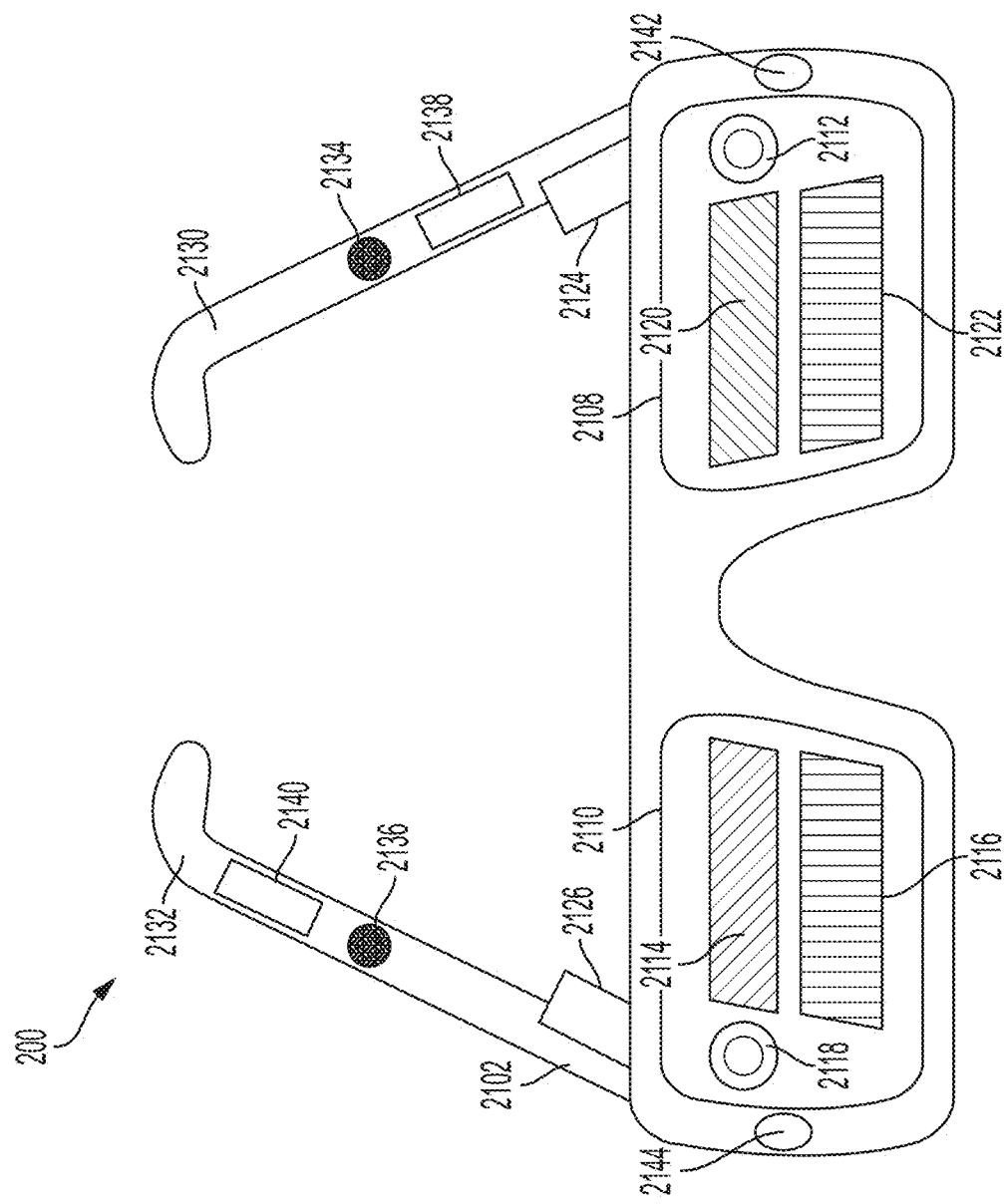
FIGS. 2A-2D illustrate components of an example mixed reality system that can be used to generate and interact with a mixed reality environment, according to some embodiments.
Figure 2B:
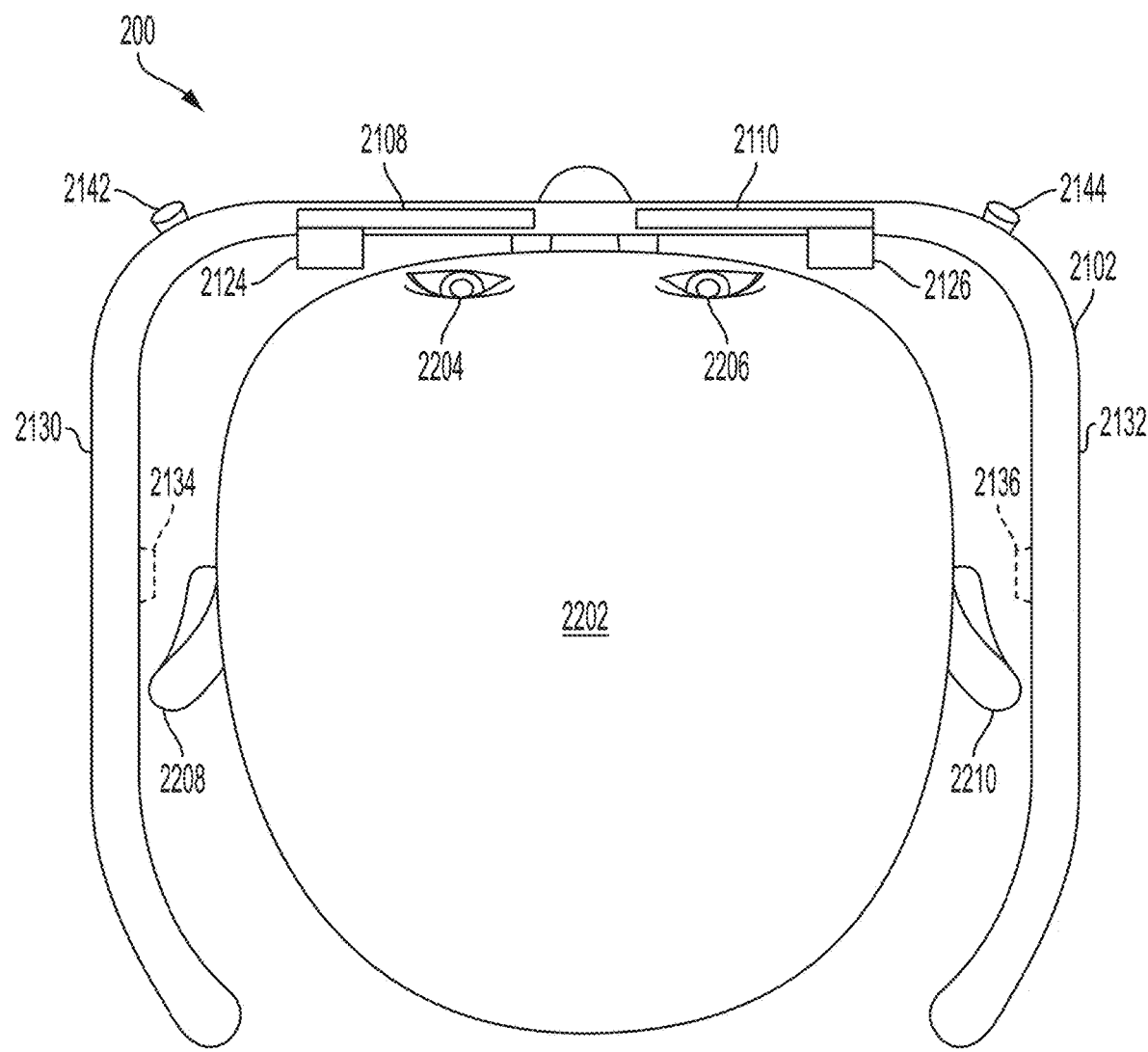
Figure 2C:
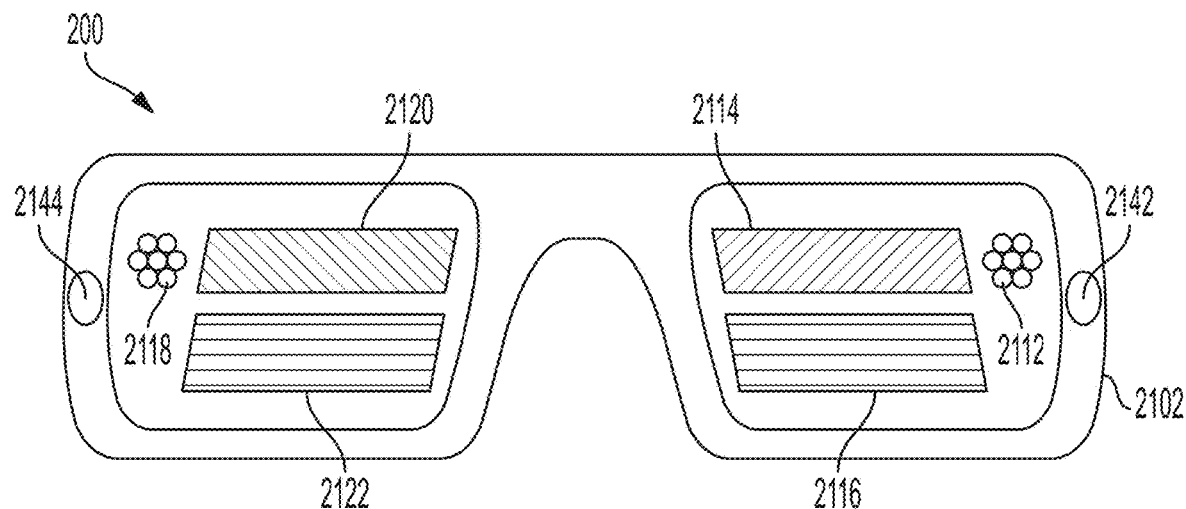
Figure 2D:
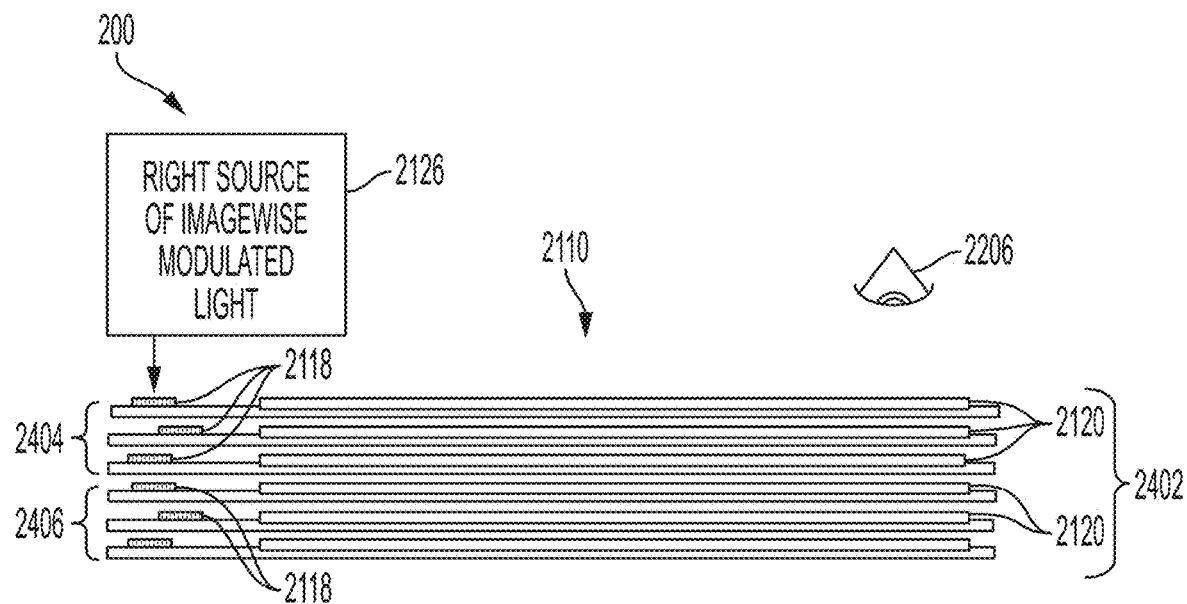

FIGS. 2A-2D illustrate components of an example mixed reality system 200 (which may correspond to mixed reality system 112) that may be used to present an MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (µLED) or micro Organic Light Emitting Diode (µOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
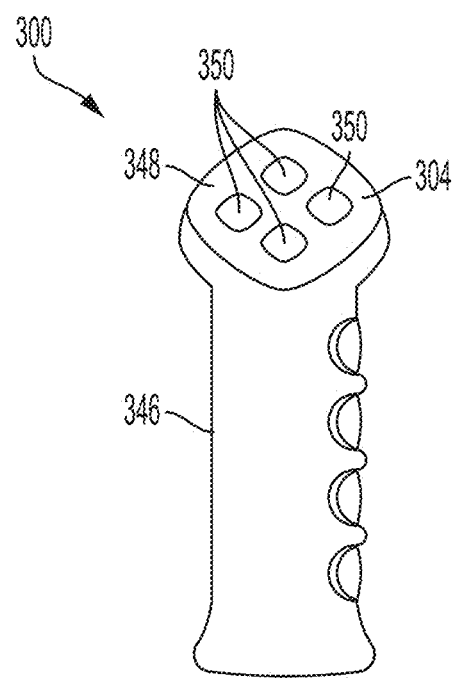
FIG. 3A illustrates an example mixed reality handheld controller that can be used to provide input to a mixed reality environment, according to some embodiments.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
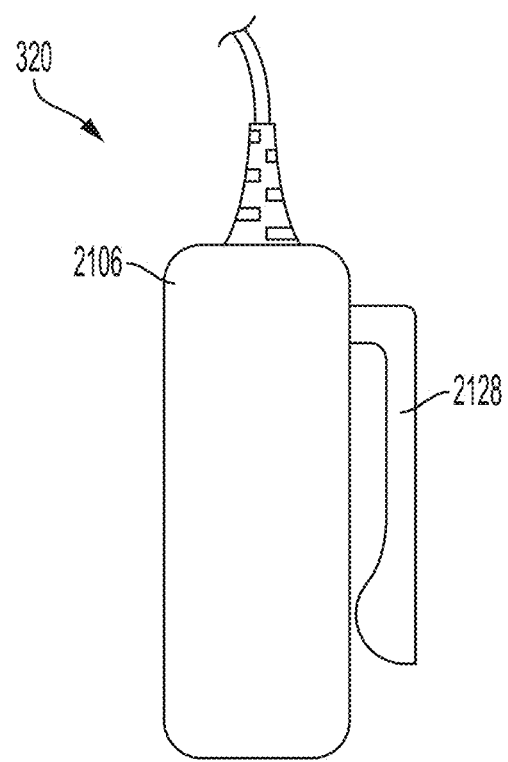
FIG. 3B illustrates an example auxiliary unit that can be used with an example mixed reality system, according to some embodiments.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
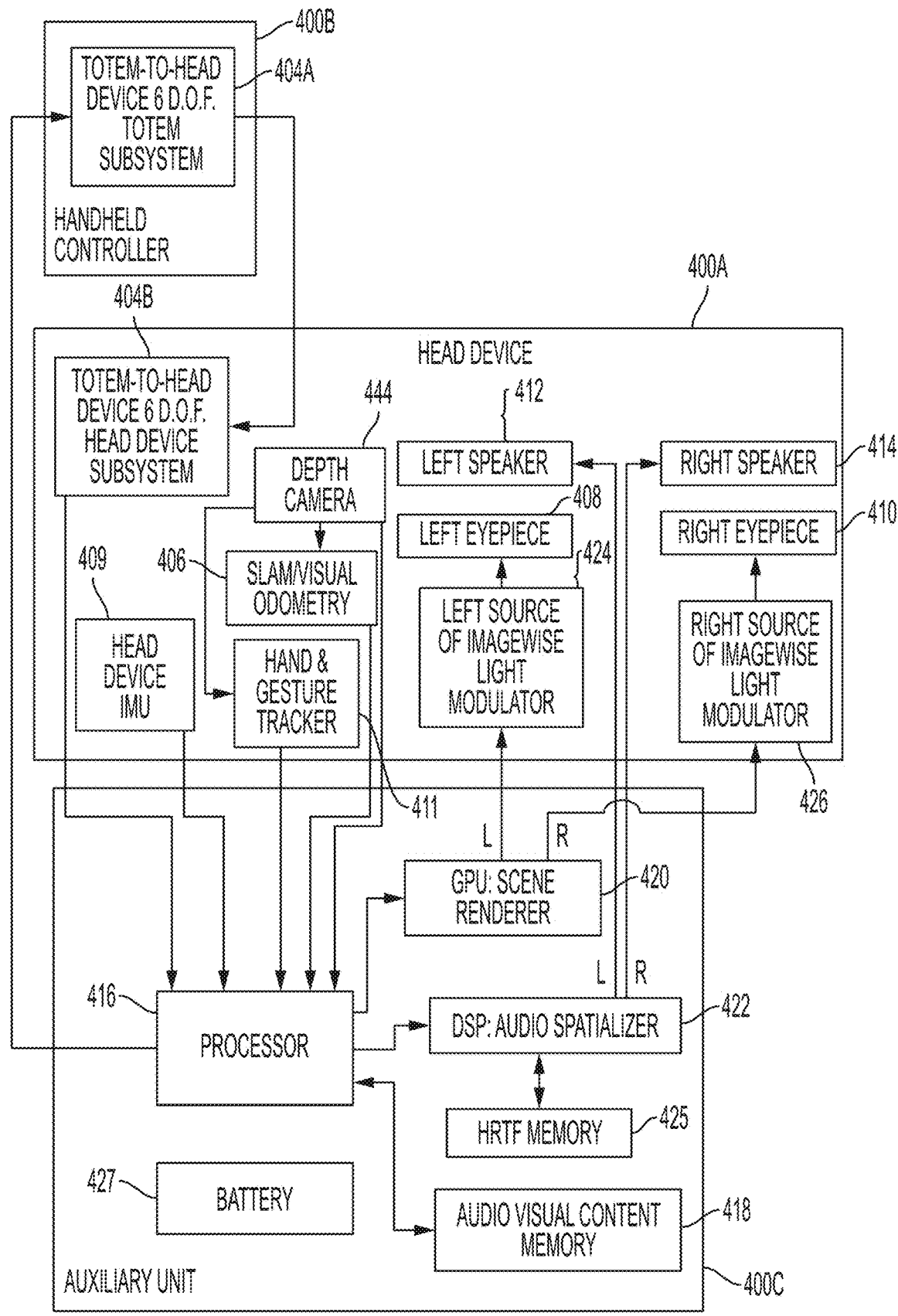
FIG. 4 illustrates an example functional block diagram for an example mixed reality system, according to some embodiments.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Tool Bridge

MR systems may leverage virtual object persistence to enhance productivity workflows for users. In some embodiments, virtual object persistence can include the ability to display virtual content as if the virtual content was real. For example, a virtual object may be displayed as resting on a real table. In some embodiments, a user could walk around the table and observe the virtual object from different angles as if the virtual object was really sitting on the table. This ability to naturally view and/or interact with virtual content may be superior to other methods. For example, viewing a 3D model on a 2D screen can require a number of workarounds. Users may have to use a computer mouse to drag the 3D model around to display different viewing angles. However, due to the nature of displaying 3D content on a 2D screen, such an experience can be frustrating as the 3D content may change views in unintended ways. In some embodiments, MR systems may also enable multiple users to collaborate on 3D content. For example, two users working on the same 3D content may view the 3D content projected in three-dimensional space using MR systems. In some embodiments, the 3D content may be synchronized and/or positioned the same way for both users of MR systems. Users may then collaborate by referring to aspects of 3D content, moving around to view different angles, etc.

Although MR systems may be superior to 2D screens in viewing 3D content, some tasks may remain more efficient to perform on other computing systems. For example, complex 3D model simulations, rendering, etc. may require more computational power than can be readily available in a mobile MR system. In some embodiments, it can be beneficial to offload computationally complex tasks to systems like a desktop computer, which may have more computational power and may not be limited by a battery pack.

It can therefore be desirable to develop systems and methods to connect MR systems with other computing systems. A seamless connection may allow a computing system to render and/or simulate a model and push the virtual content to an MR system for viewing. In some embodiments, changes and/or annotations may be made to the virtual content on an MR system, and the changes and/or annotations can be pushed back to the connected computing system. Systems and methods for connecting MR systems with other computing systems may be especially beneficial for productivity workflows. Users of computer-aided design ("CAD") software may perform many iterations on 3D models, and it may be beneficial to enable CAD users to quickly make a change to a 3D model and view the change in 3D space. In some embodiments, it can be beneficial for CAD users to change and/or annotate a 3D model (e.g., using an MR system) and push the changes and/or annotations to the connected computing systems and/or share the changes/annotations with other MR systems.

Figure 5A:
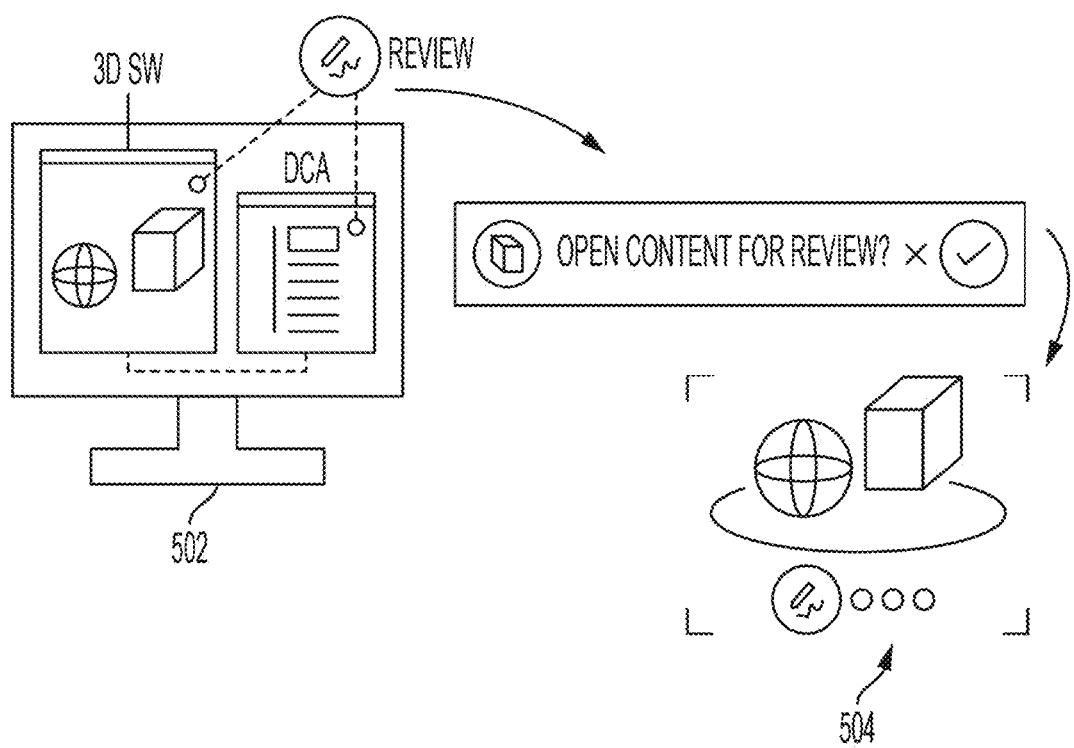
FIGS. 5A-5E illustrate an example of a mixed reality work flow across multiple computing systems, according to some embodiments.

FIGS. 5A-5E illustrate an exemplary workflow for working with virtual content across multiple computing systems, according to some embodiments. In FIG. 5A, a computing system (e.g., a desktop computer) 502 may include virtual content 504. A user may create virtual content on computing system 502 using software (e.g., Maya, Autodesk, etc.), and the user may wish to view the virtual content in 3D space. In some embodiments, virtual content 504 can be one or more 3D models. In some embodiments, virtual content 504 can include metadata about one or more 3D models.

Figure 5B:
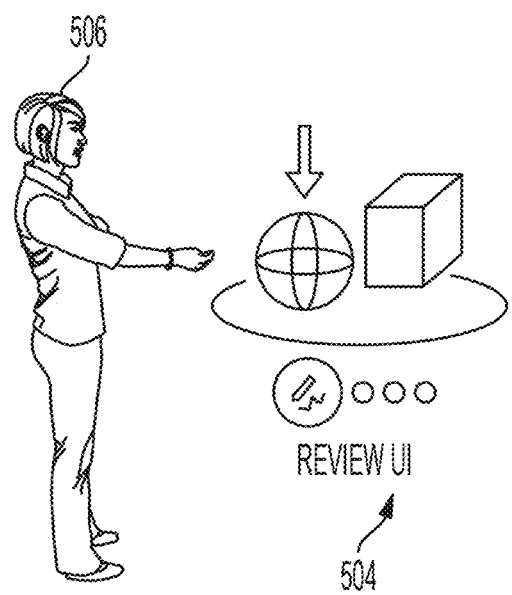

In FIG. 5B, user 506 may receive virtual content 504 using an MR system (e.g., MR system 112, 200). In some embodiments, virtual content 504 may be displayed using the MR system, and virtual content 504 may be displayed in 3D space. User 506 may interact with virtual content 504 by viewing it from different angles and/or manipulating it (e.g., enlarging it, shrinking it, removing portions, adding portions, annotating it, and/or changing other properties of virtual content 504).

Figure 5C:
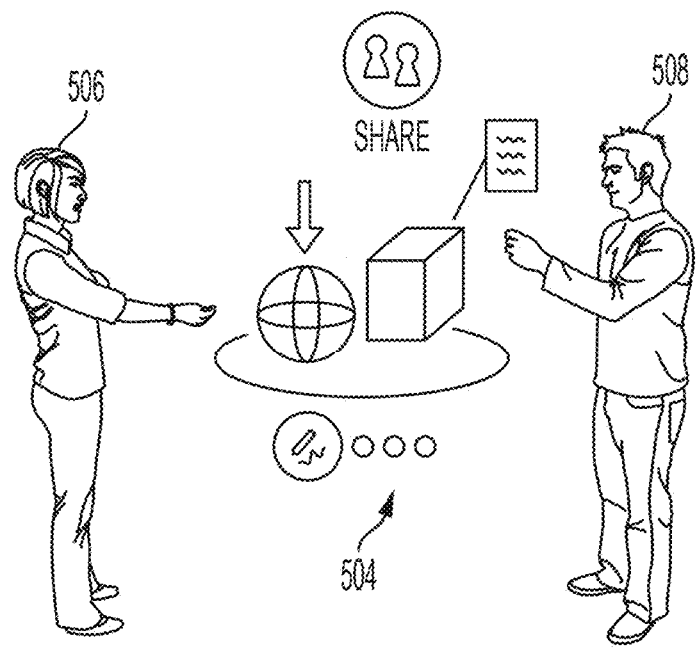

In FIG. 5C, user 506 and user 508 may collaborate on virtual content 504. In some embodiments, users 506 and 508 may see virtual content 504 in the same location (e.g., the same real-world location, as if virtual content 504 was real), which may facilitate collaboration. In some embodiments, users 506 and 508 may be remote from each other (e.g., they may be in different rooms), and users 506 and 508 may see virtual content 504 in the same position relative to an anchor point (which may also serve as a positional reference for other virtual content displayed to collaborating users). For example, user 506 may point to a part of virtual content 504, and user 508 may observe that user 506 is pointing to the intended part of virtual content 504. In some embodiments, users 506 and/or 508 may interact with virtual content 504 by viewing it from different angles and/or manipulating it (e.g., enlarging it, shrinking it, removing portions, adding portions, annotating it, and/or changing other properties of virtual content 504).

Figure 5D:
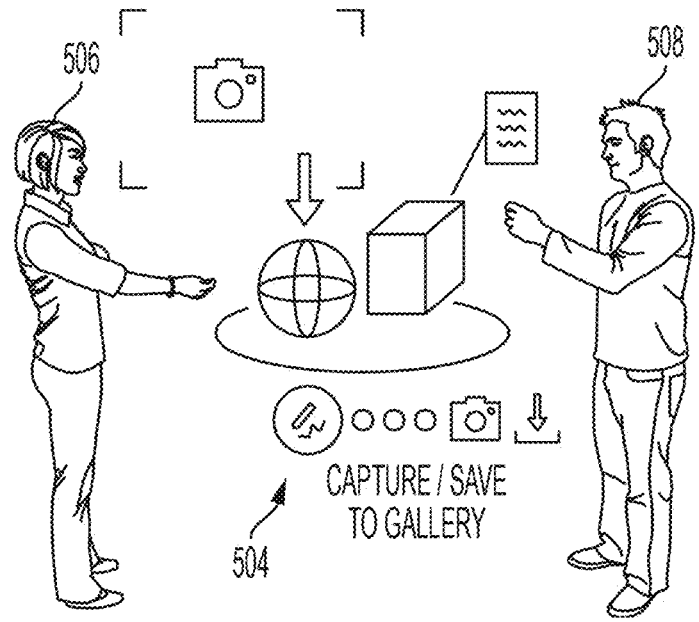

In FIG. 5D, user 506 and/or 508 may save changes to virtual content 504. For example, user 506 and/or 508 may have interacted with and/or modified virtual content 504 and may desire to export virtual content 504 to another computing system. It can be beneficial to enable easy transitioning from an MR system to another computing system because some tasks may be better performed on a specific system (e.g., an MR system may be best equipped to view and/or make minor changes to a 3D model, and a desktop computer may be best equipped to make computationally expensive changes to a 3D model).

Figure 5E:
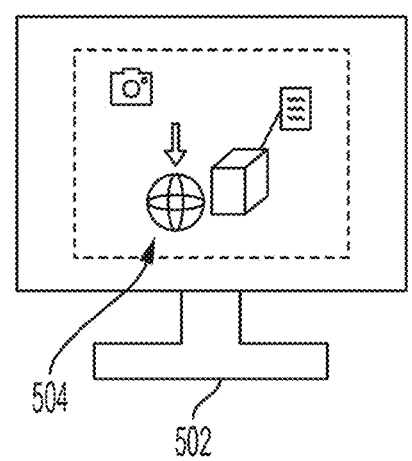

In FIG. 5E, virtual content 504 may be presented on computing system 502, which may be connected to one or more MR systems. In some embodiments, virtual content 504 may include one or more changes made to virtual content 504 by one or more MR systems.

Although a collaboration of two users is depicted, it is contemplated that any number of users in any number of physical arrangements may collaborate on virtual content. For example, users 506 and 508 may be in the same physical environment (e.g., in the same first room), and users 506 and 508 may see virtual content in the same position relative to their physical environment. Concurrently, a third user may be in a different physical environment (e.g., a second room) also see the same virtual content. In some embodiments, the virtual content for the third user may be positioned in a different real-world location (e.g., due to the fact that the third user is in a different real-world location). In some embodiments, the shared virtual content may be displaced from a first anchor point for the third user, and the displacement may be the same as a displacement for users 506 and 508 relative to a second anchor point.

Figure 6:
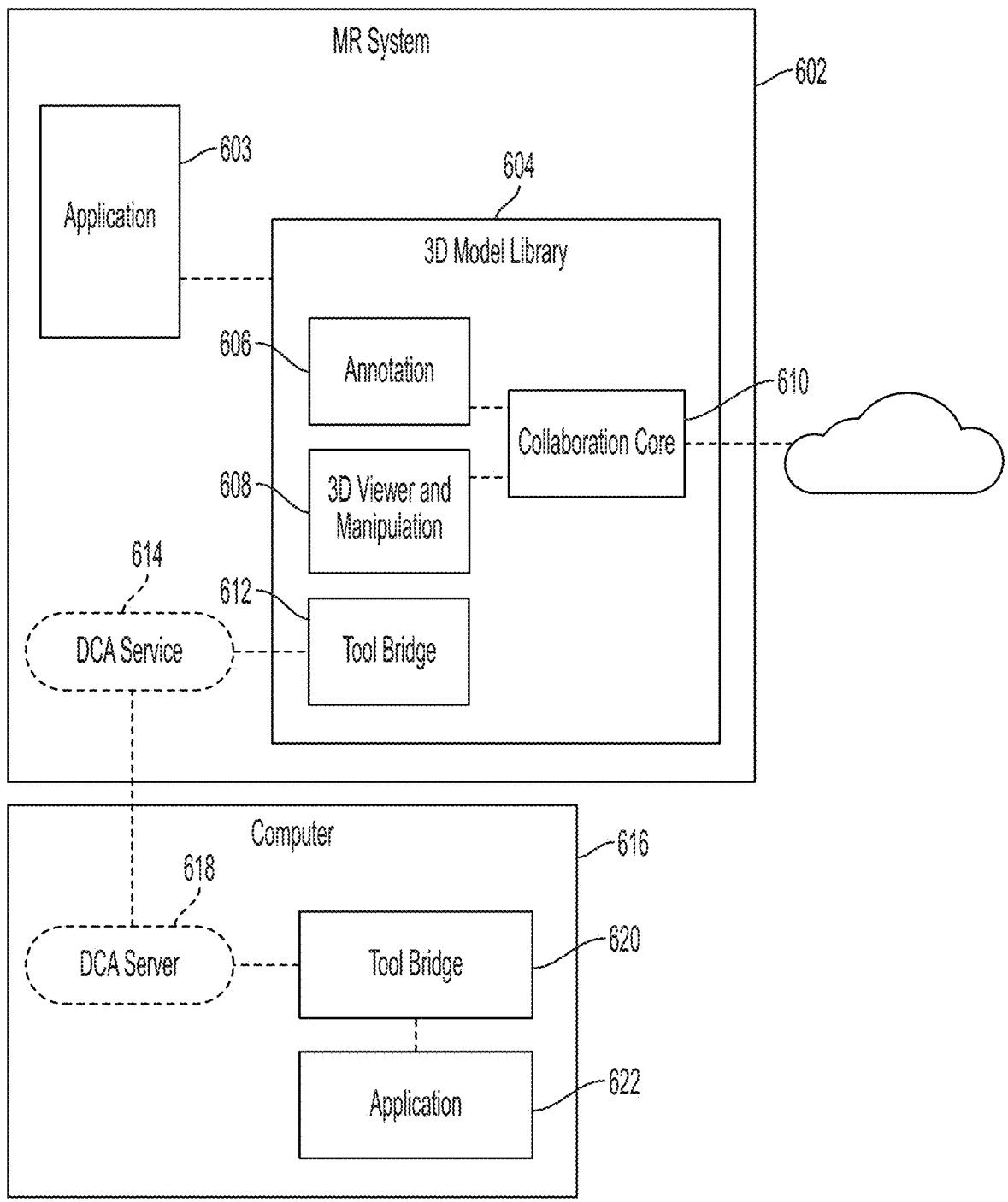
FIG. 6 illustrates an example of a tool bridge architecture, according to some embodiments.

FIG. 6 illustrates an exemplary tool bridge, according to some embodiments. In some embodiments, computer 616 may include virtual content, and it may be desirable to transfer virtual content to MR system 602 (which can correspond to MR systems 112, 200). In some embodiments, application 622 (e.g., a CAD application, or other application capable of creating or editing a 3D model) may manage the virtual content to be transferred to and/or received by MR system 602 (e.g., a 3D model). In some embodiments, the full virtual content may be transmitted between computer 616 and MR system 602. In some embodiments, components of virtual content may be transmitted between computer 616 and MR system 602. For example, if a texture of a 3D model has been changed by an MR system, only the texture change may be transmitted to computer 616. In some embodiments, transmitting delta files may be more efficient than transmitting full virtual content.

In some embodiments, application 622 may transmit and/or receive the virtual content to tool bridge 620. Tool bridge 620 can include one or more computer systems configured to execute instructions. In some embodiments, tool bridge 620 can be a script configured to interface with application 622. For example, application 622 may be a CAD application (e.g., Maya), and tool bridge 620 can include a plug-in script that may be used to transfer 3D models from a desktop computer to an MR system. In some embodiments, tool bridge 620 may generate a data package corresponding to the virtual content. For example, tool bridge 620 may generate a data package that includes metadata of virtual content. In some embodiments, tool bridge 620 may encrypt virtual content. In some embodiments, tool bridge 620 may generate a data package that includes data corresponding to a desired destination for virtual content. For example, tool bridge 620 may specify a directory location in MR system 602 where the virtual content should be stored. In some embodiments, tool bridge 620 may specify an application on MR system 620 as a destination for the virtual content. In some embodiments, tool bridge 620 may indicate that a payload (e.g., a payload of a data package) includes a delta file. In some embodiments, tool bridge 620 may indicate that a payload includes standalone virtual content. In some embodiments, tool bridge 620 may also parse a received data package (see description of tool bridge 612 below).

In some embodiments, tool bridge 620 may be configured to execute instructions, which may run in a run-time environment. In some embodiments, tool bridge 620 can be configured to execute a sub-process of a parent process. In some embodiments, tool bridge 620 can be configured to execute a thread of a parent process. In some embodiments, tool bridge 620 can be configured to operate a service (e.g., as a background operating system service). In some embodiments, a process, sub-process, thread, and/or service executed by tool bridge 620 can be configured to continually run (e.g., in the background) while an operating system of a host system is running. In some embodiments, a service executed by tool bridge 620 can be an instantiation of a parent background service, which may serve as a host process to one or more background processes and/or sub-processes.

In some embodiments, tool bridge 620 may transmit and/or receive a data package to desktop companion application ("DCA") server 618. DCA server 618 can include one or more computer systems configured to execute instructions and may function as an interface between computer 616 and MR system 602. In some embodiments, DCA server 618 may manage and/or provide DCA service 614, which may run on MR system 602. In some embodiments, MR system 602 may include one or more computer systems configured to execute instructions. In some embodiments, DCA server 618 may manage and/or determine a network socket to transmit the data package to and/or receive a data package from.

In some embodiments, DCA server 618 may be configured to execute instructions, which may run in a run-time environment. In some embodiments, DCA server 618 can be configured to execute a sub-process of a parent process. In some embodiments, DCA server 618 can be configured to execute a thread of a parent process. In some embodiments, DCA server 618 can be configured to operate a service (e.g., as a background operating system service). In some embodiments, a process, sub-process, thread, and/or service executed by DCA server 618 can be configured to continually run (e.g., in the background) while an operating system of a host system is running. In some embodiments, a service executed by DCA server 618 can be an instantiation of a parent background service, which may serve as a host process to one or more background processes and/or sub-processes.

In some embodiments, DCA service 614 may include one or more computer systems configured to execute instructions and may be configured to receive and/or transmit a data package (e.g., a data package corresponding to virtual content). In some embodiments, DCA service 614 may be configured to transmit a data package to and/or receive a data package from 3D model library 602.

In some embodiments, DCA service 614 may be configured to execute instructions, which may run in a run-time environment. In some embodiments, DCA service 614 can be configured to execute a sub-process of a parent process. In some embodiments, DCA service 614 can be configured to execute a thread of a parent process. In some embodiments, DCA service 614 can be configured to operate a service (e.g., as a background operating system service). In some embodiments, a process, sub-process, thread, and/or service executed by DCA service 614 can be configured to continually run (e.g., in the background) while an operating system of a host system is running. In some embodiments, a service executed by DCA service 614 can be an instantiation of a parent background service, which may serve as a host process to one or more background processes and/or sub-processes.

In some embodiments, 3D model library 604 can include one or more computer systems configured to execute instructions. For example, 3D model library 604 may be configured to execute a process, which may run in a run-time environment. In some embodiments, 3D model library 604 can be configured to execute a sub-process of a parent process. In some embodiments, 3D model library 604 can be configured to execute a thread of a parent process. In some embodiments, 3D model library 604 can be configured to operate a service (e.g., as a background operating system service). In some embodiments, a process, sub-process, thread, and/or service executed by 3D model library 604 can be configured to continually run (e.g., in the background) while an operating system of a host system is running. In some embodiments, a service executed by 3D model library 604 can be an instantiation of a parent background service, which may serve as a host process to one or more background processes and/or sub-processes.

3D model library 604 can manage editing virtual content (e.g., 3D models) and/or synchronizing virtual content with other systems. In some embodiments, 3D model library 604 can include tool bridge 612. In some embodiments, tool bridge 612 may be configured to receive and/or transmit a data package. In some embodiments, tool bridge 612 may parse a received data package. For example, tool bridge 612 may decrypt information contained in a data package. In some embodiments, tool bridge 612 may extract data corresponding to a destination. For example, tool bridge 612 may extract a file directory location and store data corresponding to the data package at the location. In some embodiments, tool bridge 612 may determine that a payload of a data package includes a delta file. In some embodiments, tool bridge 612 may determine that a payload of a data package includes standalone virtual content. In some embodiments, tool bridge 612 may generate a data package.

In some embodiments, 3D model library 604 may transmit information (e.g., corresponding to the shared virtual content) to application 603. In some embodiments, MR system 602 may display the virtual content (e.g., using application 603, which may be a gallery application). In some embodiments, application 603 may display updated virtual content corresponding to a data package received from computer 616. In some embodiments, application 603 may replace previously displayed virtual content with newly received virtual content. In some embodiments, application 603 may modify previously displayed virtual content based on a delta file received from computer 616. In some embodiments, a user may modify the virtual content (e.g., by rotating the virtual content, adding to the virtual content, removing virtual content, annotating virtual content, etc.). In some embodiments, annotations (e.g., markings, comments, etc.) to virtual content may be managed, stored, and/or recorded in annotation module 606. In some embodiments, annotation module 606 may facilitate annotating virtual content (e.g., by providing a user interface for a user to annotate virtual content). In some embodiments, 3D content manipulations (e.g., rotating 3D content, adding content, removing content) may be managed and/or stored in 3D viewer and manipulation module 608. In some embodiments, 3D viewer and manipulation module 608 may facilitate manipulating virtual content (e.g., by providing a user interface for a user to manipulate virtual content).

In some embodiments, changes to 3D content (e.g., annotations, other manipulations) may be transmitted to collaboration core 610. In some embodiments, collaboration core 610 may generate a data package corresponding to changes to 3D content. In some embodiments, collaboration core 610 may transmit a data package to a remote server to handle synchronization of simultaneous edits to 3D content (e.g., if another user is simultaneously editing the same 3D content). In some embodiments, collaboration core 610 can be configured to package data for an external synchronization service (e.g., Firebase). In some embodiments, collaboration core 610 may receive data corresponding to changes made to 3D content.

Although certain functions may be depicted as associated with certain blocks and/or structures, it is contemplated that multiple functions may be combined into a single block. In some embodiments, a single function may be split into multiple blocks. In some embodiments, 3D model library 604 may be included in application 603. In some embodiments, collaboration core 610 may run as a background operating service of MR system 604.

Figure 7:
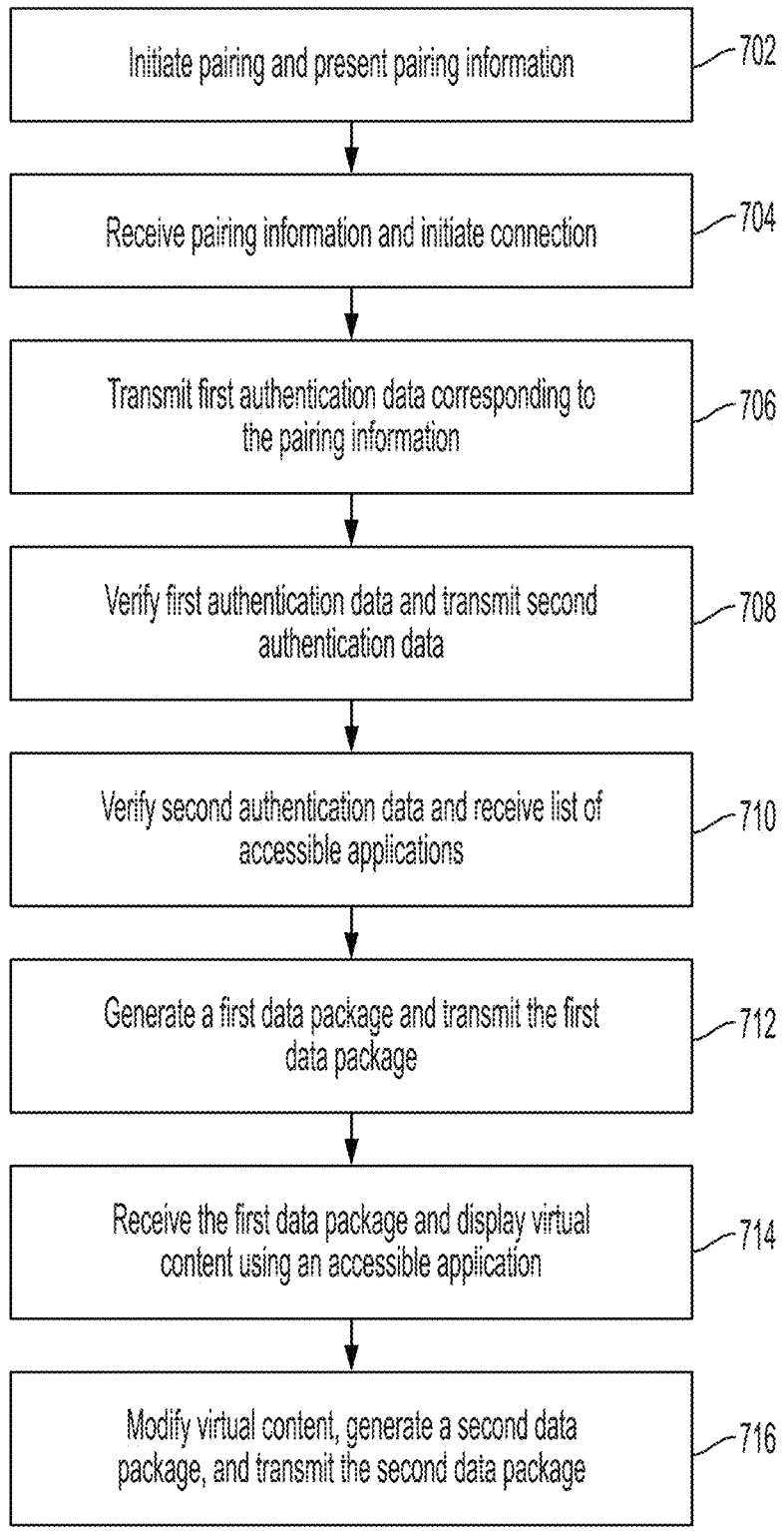
FIG. 7 illustrates an example process for initializing a connection between a computing system and a mixed reality system, according to some embodiments.

FIG. 7 illustrates an exemplary process for initializing a connection between a computing system and an MR system, according to some embodiments. At step 702, a pairing process can be initiated and pairing information can be present. In some embodiments, step 702 may be performed using a computing system (e.g., a desktop computer). For example, a user may download a desktop companion app to a desktop computer, and the user may desire to connect the desktop computer with an MR system. In some embodiments, the user may log into the DCA using an account associated with the MR system. In some embodiments, pairing information can be presented. For example, the DCA may present a QR code on a screen of the desktop computer. In some embodiments, the QR code may include an IP address of the computer. In some embodiments, the QR code may include a network port of the computer. In some embodiments, the QR code may include a hash of an encryption key. In some embodiments, the QR code may include a hash of a security certificate.

At step 704, pairing information can be received and a connection may be initiated. In some embodiments, step 704 can be performed using an MR system. For example, a user may open a QR code reading application on an MR system. In some embodiments, an MR system may automatically detect QR codes. In some embodiments, a notification may be presented to a user (e.g., as a result of the user logging into the DCA using an associated account). In some embodiments, the MR system may receive pairing information (e.g., by reading a QR code displayed by a desktop computer). In some embodiments, the MR system may initiate a connection with the computing system (e.g., by using network information included in the pairing information). In some embodiments, having the MR system initiate a connection with the computing system may be more secure. For example, the computing system may initiate a connection with an incorrect MR system and/or be intercepted by a rogue system, and sensitive information may be inadvertently transmitted.

At step 706, a first authentication data may be transmitted corresponding to the pairing information. In some embodiments, step 706 may be performed using a computing system. For example, a desktop computer may use a connection initiated by an MR system to transmit an encryption key and/or a security certificate. In some embodiments, the transmitted encryption key and/or security certificate may correspond to a hash included as part of the pairing information.

At step 708, the first authentication data may be verified and a second authentication data may be transmitted. In some embodiments, step 708 may be performed using an MR system. For example, an MR system may compute a hash for an encryption key received from the desktop computer. In some embodiments, if the computed hash corresponds to a hash included in the pairing information, the MR system may determine that it has connected with the intended computing system. In some embodiments, the MR system may transmit a second authentication data (e.g., a security certificate signed by the MR system).

At step 710, the second authentication data may be verified and a list of accessible applications may be received. In some embodiments, step 710 may be performed using a computing system. For example, a desktop computer may receive the signed security certificate and determine that the desktop computer has successfully paired with an MR system. In some embodiments, the desktop computer may receive a list of accessible applications. In some embodiments, an accessible application may be an application currently running on a paired MR system. In some embodiments, an accessible application may be an application configured to be compatible with the DCA. In some embodiments, it can be beneficial to restrict a DCA to accessing only open applications on an MR system. For example, if the DCA was compromised, the DCA may only be able to access applications a user of an MR system has explicitly opened. In some embodiments, any application on an MR system (running or not) may be considered an accessible application.

At step 712, a first data package can be generated and transmitted. In some embodiments, step 712 may be performed using a computing system. For example, a desktop computer may generate a data package corresponding to virtual content to be sent to a connected MR system. In some embodiments, the virtual content can include a 3D model. In some embodiments, the virtual content can include text. In some embodiments, the virtual content can include pictures and/or video. Any type of virtual content may be used. In some embodiments, a data package may include metadata about the virtual content. For example, a data package may include a desired destination for the virtual content. In some embodiments, a data package may be encrypted (e.g., using an encryption key).

At step 714, the first data package can be received, and virtual content may be displayed using an accessible application. In some embodiments, step 714 may be performed using an MR system. For example, an MR system may receive the first data package and extract a desired location to store the data package. In some embodiments, the MR system may decrypt the data package (e.g., using an encryption key). In some embodiments, the MR system may extract virtual content corresponding to the data package and display it to a user.

At step 716, virtual content may be modified, a second data package may be generated, and the second data package may be transmitted. In some embodiments, step 716 may be performed using an MR system. For example, a user may rotate virtual content, annotate virtual content, etc. In some embodiments, a second data package may be generated corresponding to the virtual content and/or modification to the virtual content. In some embodiments, the data package may be encrypted. In some embodiments, the data package may include a desired destination for the virtual content and/or modifications to the virtual content.

Figure 8:
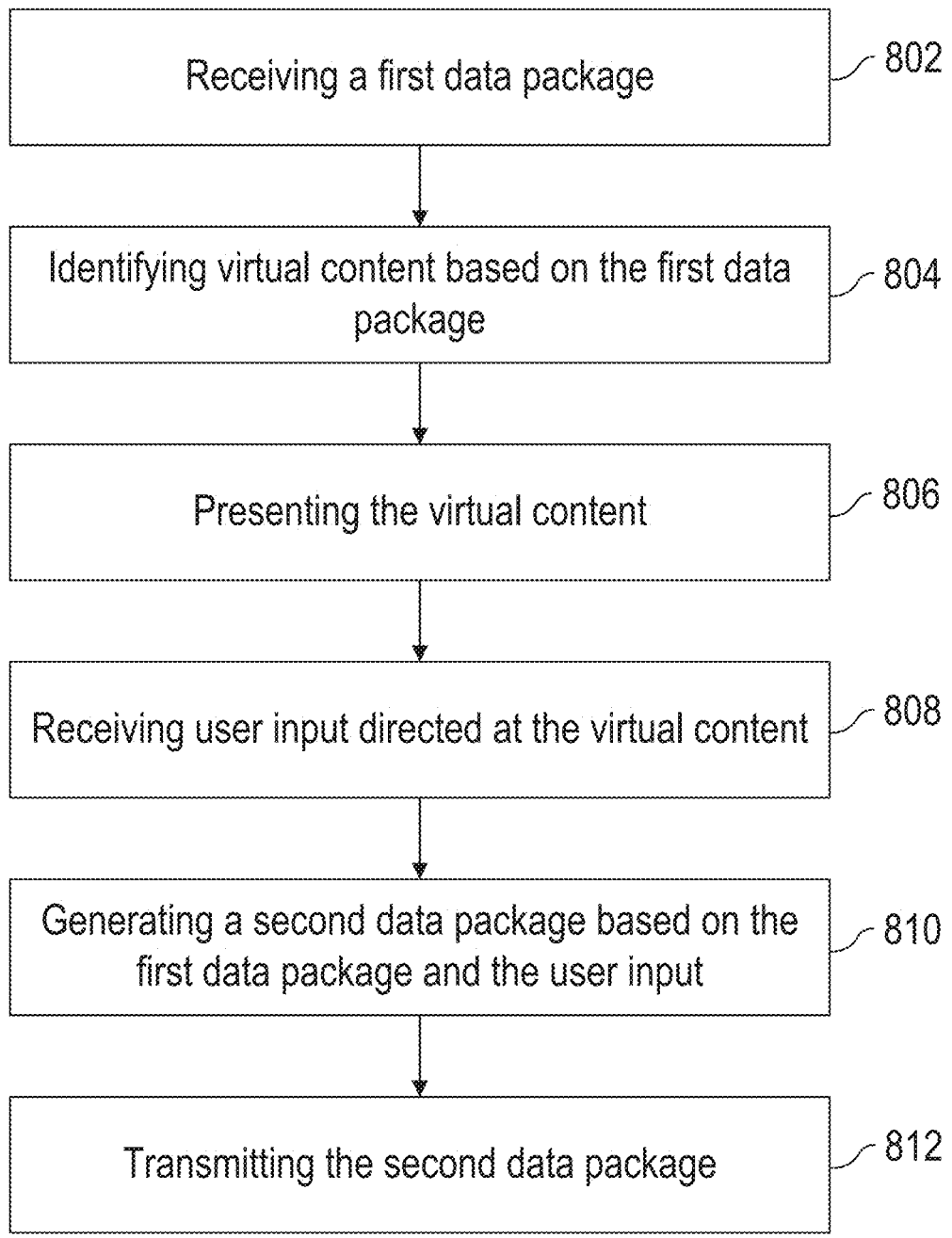
FIG. 8 illustrates an example process for utilizing a tool bridge, according to some embodiments.

FIG. 8 illustrates an exemplary process for utilizing a tool bridge, according to some embodiments. At step 802, a first data package may be received. In some embodiments, the first data package may be received at an MR system. In some embodiments, the first data package may be received from a host application. In some embodiments, the host application (e.g., a CAD application) may be configured to run on a computer system remote from the MR system and communicatively coupled to the MR system (e.g., a desktop computer connected to the MR system). In some embodiments, the first data package can include data corresponding to a 3D virtual model. In some embodiments, the first data package can include data corresponding to a desired target application to open and/or manipulate the 3D virtual model, wherein the target application may be configured to run on the MR system. In some embodiments, the virtual content can include text. In some embodiments, the virtual content can include pictures and/or video. Any type of virtual content may be used. In some embodiments, a data package may include metadata about the virtual content. For example, a data package may include a desired destination for the virtual content.

At step 804, virtual content can be identified based on the first data package. In some embodiments, step 804 may be performed at an MR system. In some embodiments, virtual content can be identified by metadata that may be included in the virtual content. For example, the metadata may indicate a file type, an application that may open/interact with the file, etc.

At step 806, virtual content can be presented. In some embodiments, step 806 may be performed at an MR system. In some embodiments, virtual content may be presented to a user of the MR system. In some embodiments, virtual content may be presented via a transmissive display of the MR system. In some embodiments, virtual content can be presented in three-dimensional space, and the user may be able to walk around the virtual content and physically inspect it from multiple angles/perspectives.

At step 808, user input directed at the virtual content may be received. In some embodiments, step 808 may be performed at an MR system. In some embodiments, a user may manipulate virtual content using an MR system. For example, a user may rotate virtual content. In some embodiments, a user may annotate virtual content. In some embodiments, a user may remove portions of virtual content (e.g., a user may remove one or more geometric features of a 3D model). In some embodiments, a user may add to the virtual content.

At step 810, a second data package may be generated based on the user input and based on the first data package. In some embodiments, step 810 may be performed at an MR system. In some embodiments, the second data package can correspond to one or more manipulations of virtual content (e.g., one or more manipulations made by a user of an MR system). In some embodiments, the second data package can include data corresponding to a 3D virtual model. In some embodiments, the second data package can include data corresponding to a desired target application to open and/or manipulate the 3D virtual model, wherein the target application may be configured to run on a computer system remote to the MR system. In some embodiments, the virtual content can include text. In some embodiments, the virtual content can include pictures and/or video. Any type of virtual content may be used. In some embodiments, a data package may include metadata about the virtual content. For example, a data package may include a desired destination for the virtual content.

At step 812, the second data package may be transmitted. In some embodiments, step 812 may be performed at an MR system. In some embodiments, the second data package may be transmitted to a remote computer system communicatively coupled to the MR system. For example, the second data package may be transmitted to a desktop computer. In some embodiments, the second data package may be transmitted to a mobile device (e.g., a smartphone).

Systems, methods, and computer-readable media are disclosed. According to some examples, a system comprises: a wearable device comprising a transmissive display; one or more processors configured to execute a method comprising: receiving, from a host application via the transmissive display, a first data package comprising first data; identifying virtual content based on the first data; presenting a view of the virtual content via the transmissive display; receiving, via an input device of the wearable device, first user input directed at the virtual content; generating second data based on the first data and the first user input; and sending, to the host application via the wearable device, a second data package comprising the second data, wherein the host application is configured to execute via one or more processors of a computer system remote to the wearable device and in communication with the wearable device. In some examples, the virtual content comprises 3D graphical content and the host application comprises a computer-aided drawing application. In some examples, the method further comprises: receiving second user input; and modifying the view of the virtual content based on the second user input. In some examples, the virtual content comprises 3D graphical content, the first data corresponds to a first state of the 3D graphical content, and the host application is configured to modify the first state of the 3D graphical content based on the second data. In some examples, the virtual content comprises a 3D model, identifying virtual content based on the first data comprises identifying the 3D model in a 3D model library, and presenting the view of the virtual content comprises presenting a view of the 3D model identified in the 3D model library. In some examples, the virtual content comprises 3D graphical content, and the first data comprises data representing a change between a first state of the 3D graphical content and an earlier state of the 3D graphical content. In some examples, receiving the first data package from the host application comprises receiving the first data package via a first helper application configured to execute via the one or more processors of the computer system.

According to an examples, a method comprises: receiving, from a host application via a wearable device comprising a transmissive display, a first data package comprising first data; identifying virtual content based on the first data; presenting a view of the virtual content via the transmissive display; receiving, via an input device of the wearable device, first user input directed at the virtual content; generating second data based on the first data and the first user input; and sending, to the host application via the wearable device, a second data package comprising the second data, wherein the host application is configured to execute via one or more processors of a computer system remote to the wearable device and in communication with the wearable device. In some examples, the virtual content comprises 3D graphical content and the host application comprises a computer-aided drawing application. In some examples, the method further comprises: receiving second user input; and modifying the view of the virtual content based on the second user input. In some examples, the virtual content comprises 3D graphical content, the first data corresponds to a first state of the 3D graphical content, and the host application is configured to modify the first state of the 3D graphical content based on the second data. In some examples, the virtual content comprises a 3D model, identifying virtual content based on the first data comprises identifying the 3D model in a 3D model library, and presenting the view of the virtual content comprises presenting a view of the 3D model identified in the 3D model library. In some examples, the virtual content comprises 3D graphical content, and the first data comprises data representing a change between a first state of the 3D graphical content and an earlier state of the 3D graphical content. In some examples, receiving the first data package from the host application comprises receiving the first data package via a first helper application configured to execute via the one or more processors of the computer system.

According to some examples, a non-transitory computer-readable medium stores instructions that, when executed by one or more processors, cause the one or more processors to execute a method comprising: receiving, from a host application via a wearable device comprising a transmissive display, a first data package comprising first data; identifying virtual content based on the first data; presenting a view of the virtual content via the transmissive display; receiving, via an input device of the wearable device, first user input directed at the virtual content; generating second data based on the first data and the first user input; sending, to the host application via the wearable device, a second data package comprising the second data, wherein the host application is configured to execute via one or more processors of a computer system remote to the wearable device and in communication with the wearable device. In some examples, the virtual content comprises 3D graphical content and the host application comprises a computer-aided drawing application. In some examples, the method further comprises: receiving second user input; and modifying the view of the virtual content based on the second user input. In some examples, the virtual content comprises 3D graphical content, the first data corresponds to a first state of the 3D graphical content, and the host application is configured to modify the first state of the 3D graphical content based on the second data. In some examples, the virtual content comprises a 3D model, identifying virtual content based on the first data comprises identifying the 3D model in a 3D model library, and presenting the view of the virtual content comprises presenting a view of the 3D model identified in the 3D model library. In some examples, the virtual content comprises 3D graphical content, and the first data comprises data representing a change between a first state of the 3D graphical content and an earlier state of the 3D graphical content. In some examples, receiving the first data package from the host application comprises receiving the first data package via a first helper application configured to execute via the one or more processors of the computer system.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:
1. A wearable device comprising:
   a transmissive display;
   an input device; and
   one or more processors configured to execute a method comprising:
      receiving, from a host application via the wearable device, a first data package comprising first data;
      identifying virtual content based on the first data;
      presenting a view of the virtual content via the transmissive display;
      receiving, via the input device, first user input directed at the virtual content;
      generating second data based on the first data and the first user input; and
      sending, to the host application via the wearable device, a second data package comprising the second data,
   wherein:
      receiving the first data package from the host application comprises receiving the first data package from a host application executing via a second one or more pro- cessors of a computer system remote to the wearable device and in communication with the wearable device,
the virtual content comprises an asset,
identifying virtual content based on the first data comprises identifying the asset in an asset library, and
presenting the view of the virtual content comprises presenting a view of the asset identified in the asset library.

2. The wearable device of claim 1, wherein the host application comprises a computer-aided drawing application.

3. The wearable device of claim 1, the method further comprising:
receiving second user input; and
modifying the view of the virtual content based on the second user input.

4. The wearable device of claim 1, wherein:
the first data corresponds to a first state of the asset, and
the host application is configured to modify the first state of the asset based on the second data.

5. The wearable device of claim 1, wherein:
the first data comprises data representing a change between a first state of the asset and an earlier state of the asset.

6. The wearable device of claim 1, wherein receiving the first data package from the host application comprises receiving the first data package via a first helper application configured to execute via the second one or more processors of the computer system remote to the wearable device.

7. The wearable device of claim 1, wherein the asset comprises a 3D asset.

8. A method comprising:
receiving, from a host application via a wearable device comprising a transmissive display, a first data package comprising first data;
identifying virtual content based on the first data;
presenting a view of the virtual content via the transmissive display;
receiving, via an input device of the wearable device, first user input directed at the virtual content;
generating second data based on the first data and the first user input; and
sending, to the host application via the wearable device, a second data package comprising the second data,
wherein:
receiving the first data package from the host application comprises receiving the first data package from a host application executing via a second one or more processors of a computer system remote to the wearable device and in communication with the wearable device,
the virtual content comprises an asset,
identifying virtual content based on the first data comprises identifying the asset in an asset library, and
presenting the view of the virtual content comprises presenting a view of the asset identified in the asset library.

9. The method of claim 8, wherein the host application comprises a computer-aided drawing application.

10. The method of claim 8, further comprising:
receiving second user input; and
modifying the view of the virtual content based on the second user input.

11. The method of claim 8, wherein:
the first data corresponds to a first state of the asset, and
the host application is configured to modify the first state of the asset based on the second data.

12. The method of claim 8, wherein:
the first data comprises data representing a change between a first state of the asset and an earlier state of the asset.

13. The method of claim 8, wherein receiving the first data package from the host application comprises receiving the first data package via a first helper application configured to execute via the second one or more processors of the computer system remote to the wearable device.

14. The method of claim 8, wherein the asset comprises a 3D asset.

15. A non-transitory computer-readable medium storing instructions that, when executed by one or more processors of a wearable device comprising a transmissive display, cause the one or more processors to perform a method comprising:
receiving, from a host application via the wearable device, a first data package comprising first data;
identifying virtual content based on the first data;
presenting a view of the virtual content via the transmissive display;
receiving, via an input device of the wearable device, first user input directed at the virtual content;
generating second data based on the first data and the first user input;
sending, to the host application via the wearable device, a second data package comprising the second data,
wherein:
receiving the first data package from the host application comprises receiving the first data package from a host application executing via a second one or more processors of a computer system remote to the wearable device and in communication with the wearable device,
the virtual content comprises an asset,
identifying virtual content based on the first data comprises identifying the asset in an asset library, and
presenting the view of the virtual content comprises presenting a view of the asset identified in the asset library.

16. The non-transitory computer-readable medium of claim 15, the method further comprising:
receiving second user input; and
modifying the view of the virtual content based on the second user input.

17. The non-transitory computer-readable medium of claim 15, wherein:
the first data corresponds to a first state of the asset, and
the host application is configured to modify the first state of the asset based on the second data.

18. The non-transitory computer-readable medium of claim 15, wherein:
the first data comprises data representing a change between a first state of the asset and an earlier state of the asset.

19. The non-transitory computer-readable medium of claim 15, wherein receiving the first data package from the host application comprises receiving the first data package via a first helper application configured to execute via the second one or more processors of the computer system remote to the wearable device.

20. The non-transitory computer-readable medium of claim 15, wherein the asset comprises a 3D asset.

* * * * *